United States Patent
Kamiya et al.

(10) Patent No.: US 7,941,972 B2
(45) Date of Patent: May 17, 2011

(54) POWERED OPENING AND CLOSING SYSTEM FOR VEHICLE'S DOOR

(75) Inventors: Haruo Kamiya, Kanagawa-ken (JP); Kenichi Iijima, Kanagawa-ken (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 365 days.

(21) Appl. No.: 12/222,014

(22) Filed: Jul. 31, 2008

(65) Prior Publication Data

US 2009/0033256 A1 Feb. 5, 2009

(30) Foreign Application Priority Data

Aug. 3, 2007 (JP) ................................ 2007-202871

(51) Int. Cl.
*E05F 11/00* (2006.01)
(52) U.S. Cl. .............................. 49/360; 296/155; 318/366
(58) Field of Classification Search .................... 49/360; 296/155, 146.4, 146.1; 318/366
See application file for complete search history.

(56) References Cited

U.S. PATENT DOCUMENTS

| | | | |
|---|---|---|---|
| 7,097,229 B1 * | 8/2006 | Chernoff ..................... | 296/146.1 |
| 7,267,391 B2 * | 9/2007 | Yokomori ..................... | 296/155 |
| 7,607,963 B2 * | 10/2009 | Ishihara et al. ................ | 49/360 |
| 7,698,855 B2 * | 4/2010 | Imai et al. ..................... | 49/360 |
| 7,703,838 B2 * | 4/2010 | Yokomori ..................... | 296/155 |
| 2002/0153744 A1 * | 10/2002 | Long et al. .................... | 296/155 |
| 2003/0216817 A1 * | 11/2003 | Pudney .......................... | 700/17 |
| 2004/0123525 A1 * | 7/2004 | Suzuki et al. .................. | 49/360 |
| 2005/0146159 A1 * | 7/2005 | Shen et al. ..................... | 296/155 |
| 2006/0107598 A1 * | 5/2006 | Imai et al. ..................... | 49/360 |
| 2007/0163857 A1 * | 7/2007 | Yokomori ..................... | 192/215 |
| 2007/0170795 A1 * | 7/2007 | Yokomori et al. ............. | 310/77 |
| 2008/0047199 A1 * | 2/2008 | Pribisic .......................... | 49/31 |
| 2008/0222964 A1 * | 9/2008 | Longuemare et al. ......... | 49/506 |
| 2009/0085720 A1 * | 4/2009 | Kurpinski et al. ............. | 340/5.64 |
| 2009/0229183 A1 * | 9/2009 | Kamiya ......................... | 49/28 |

FOREIGN PATENT DOCUMENTS

| | | |
|---|---|---|
| JP | 2004-098913 A | 4/2004 |
| JP | 2006-009486 A | 1/2006 |
| JP | 2006-022513 | 1/2006 |
| JP | 2007-169976 A | 7/2007 |

OTHER PUBLICATIONS

Office Action issued by Japanese Patent Office dated Aug. 25, 2009 for Japanese Patent Application No. 2007-202871 with English translation (13 page).

* cited by examiner

*Primary Examiner* — Jerry Redman
(74) *Attorney, Agent, or Firm* — Foley & Lardner LLP

(57) ABSTRACT

A powered opening and closing system includes a door supported on a vehicle body, a motor, a drive mechanism for moving the door in opening and closing directions by virtue of power of the motor, an operation detecting sensor for detecting a handle operation when the door is operated to open or close, and a control circuit for prohibiting the operation of the drive mechanism when a predetermined operation prohibiting condition is detected. The drive mechanism brakes the movement of the door by putting the clutch in an engaged state while the motor is kept stopped. While the predetermined operation prohibiting condition is detected, the control circuit controls the clutch to be engaged while keeping the motor stopped when an opening of the door is detected, and controls the clutch to be disengaged when an operation of the handle is detected by the operation detection sensor.

4 Claims, 6 Drawing Sheets

POWERED OPENING AND CLOSING SYSTEM FOR VEHICLE'S DOOR

This application claims priority from Japanese Patent Application No. 2007-202871, filed on Aug. 3, 2007, the entire subject matter of which is incorporated herein by reference.

BACKGROUND OF THE INVENTION

1. Field of the Invention

The present invention relates to a powered opening and closing system for a vehicle's door which is adapted to open and close the door using power of a drive source such as a motor.

2. Description of the Related Art

In a powered opening and closing system for a vehicle's openable and closable door, when an operation prohibiting condition such as that a vehicle is running or that the vehicle is ready for running is detected, an operation prohibiting mode is set so as to prohibit an automatic opening or closing of a sliding door by power of a motor. In addition, when the sliding door is opened abruptly due to an operation which is not based on the operator's intention such as an erroneous operation of or playing with the sliding door in question with the operation prohibiting mode set, in the event that an opening/closing control switch provided on the sliding door is operated in such a state, an electromagnetic clutch is engaged, and an operation force transmission path which links the motor and the sliding door is connected, so as to exert large resistance on the movement of the sliding door by rotating backwards the motor or a speed reduction gear. Accordingly, a braking force is applied to the sliding door so as to hold the sliding door in that position in such a way that the door is not moved therefrom (for example, refer to JP-A-2006-22513).

However, in the powered opening and closing system for a vehicle's openable and closable door disclosed in JP-A-2006-22513, even when the sliding door is opened abruptly while the operation prohibiting mode is being set, since no braking force can be applied to the sliding door being opened as long as the opening/closing control switch is operated, the sliding door may be opened widely before the opening/closing control switch is operated.

SUMMARY OF THE INVENTION

An object of the present invention is to provide a powered opening and closing system for a vehicle's door which enhances the safety of occupants by holding the door by applying a braking force as soon as the openable and closable door opens while the operation prohibiting condition is detected and by enabling the closing of the openable and closable door by a handle operation based on the intension of the operator.

According to a first aspect of the invention, there is provided a powered opening and closing system for a vehicle's door, including: a door supported on a vehicle body; a motor; a drive mechanism for moving the door in opening and closing directions by virtue of power of the motor; an operation detecting sensor for detecting a handle operation when the door is operated to open or close; and a control circuit for prohibiting the operation of the drive mechanism when a predetermined operation prohibiting condition is detected, wherein the drive mechanism includes a clutch that is configured to connect and disconnect a power transmission path between the motor and the door, the drive mechanism braking the movement of the door by putting the clutch in an engaged state while the motor is kept stopped, and wherein, while the predetermined operation prohibiting condition is detected, the control circuit is operable to: control the clutch to be engaged while keeping the motor stopped when an opening of the door is detected; and control the clutch to be disengaged when an operation of the handle is detected by the operation detection sensor.

According to a second aspect of the invention, the control circuit controls the clutch to be disengaged only when the operation detecting sensor detects an operation of the handle in a door closing direction.

According to a third aspect of the invention, the powered opening and closing system for a vehicle's door further includes: a vehicle running information unit that detects the predetermined operation prohibiting condition.

According to a fourth aspect of the invention, there is provided a powered opening and closing system for a vehicle's door, including: a door supported on a vehicle body; a motor; a drive mechanism for moving the door in opening and closing directions by virtue of power of the motor; an operation detecting sensor for detecting a handle operation when the door is operated to open or close; and a control circuit for prohibiting the operation of the drive mechanism when a predetermined operation prohibiting condition is detected, wherein the control circuit includes a brake circuit that is configured to brake the rotation of the motor by shorting across terminals of the motor, and wherein, while the predetermined operation prohibiting condition is detected, the control circuit is operable to: control the brake circuit to be on when an opening of the door is detected; and control the brake circuit to be off when an operation of the handle is detected by the operation detecting sensor.

According to a fifth aspect of the invention, the control circuit controls the brake circuit to be off only when the operation detecting sensor detects an operation of the handle in a door closing direction.

According to a sixth aspect of the invention, the powered opening and closing system for a vehicle's door further includes: a vehicle running information unit that detects the operation prohibiting condition.

According to a seventh aspect of the invention, the brake circuit includes a relay.

According to an eighth aspect of the invention, the brake circuit includes an FET.

According to the first and fourth aspects of the invention, even when the door opens in the midst of detecting of the operation prohibiting condition, the braking force can momentarily be applied to the opening door to stop it. Because of this, there is no case where the door opens widely in an abrupt fashion, thereby making it possible to enhance the safety of occupants. In addition, while the door is held in the stopped state, the door can be closed by operating the handle or releasing the brake so applied based on the intention of the operator.

According to the second, third, fifth and sixth aspects of the invention, the door can be closed based on the intention of the operator of closing the door in the midst of intention of the operation prohibiting condition.

DETAILED DESCRIPTION OF THE PREFERRED EMBODIMENTS

Figure 1:
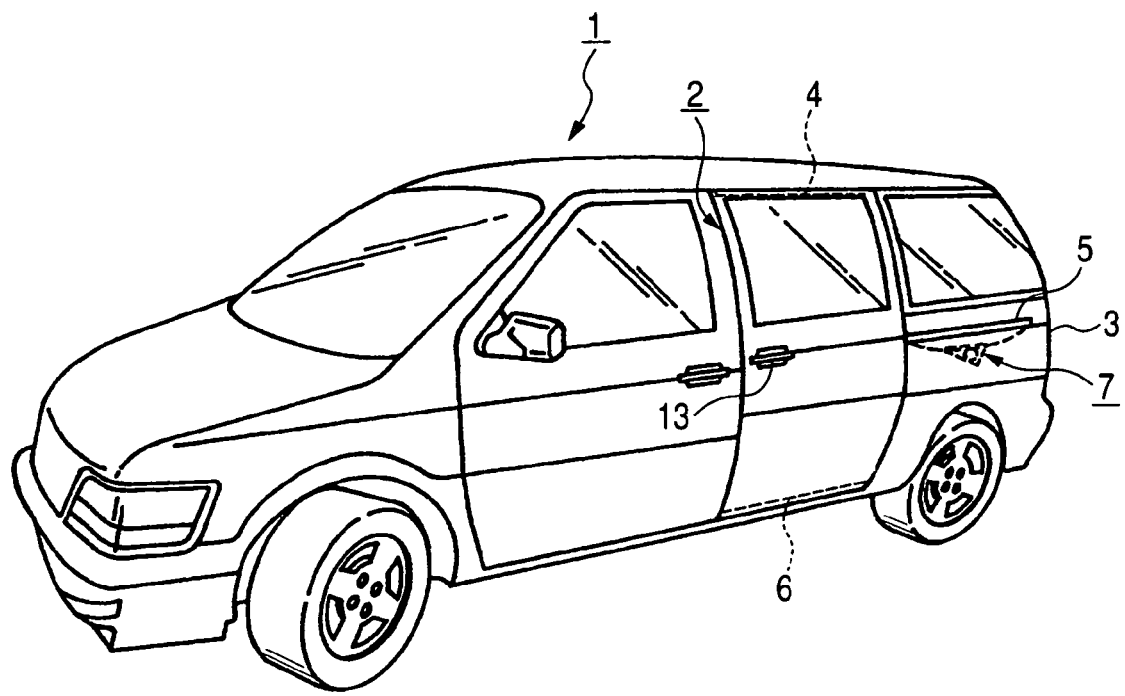
FIG. 1 is a side view of a vehicle.
Figure 2:
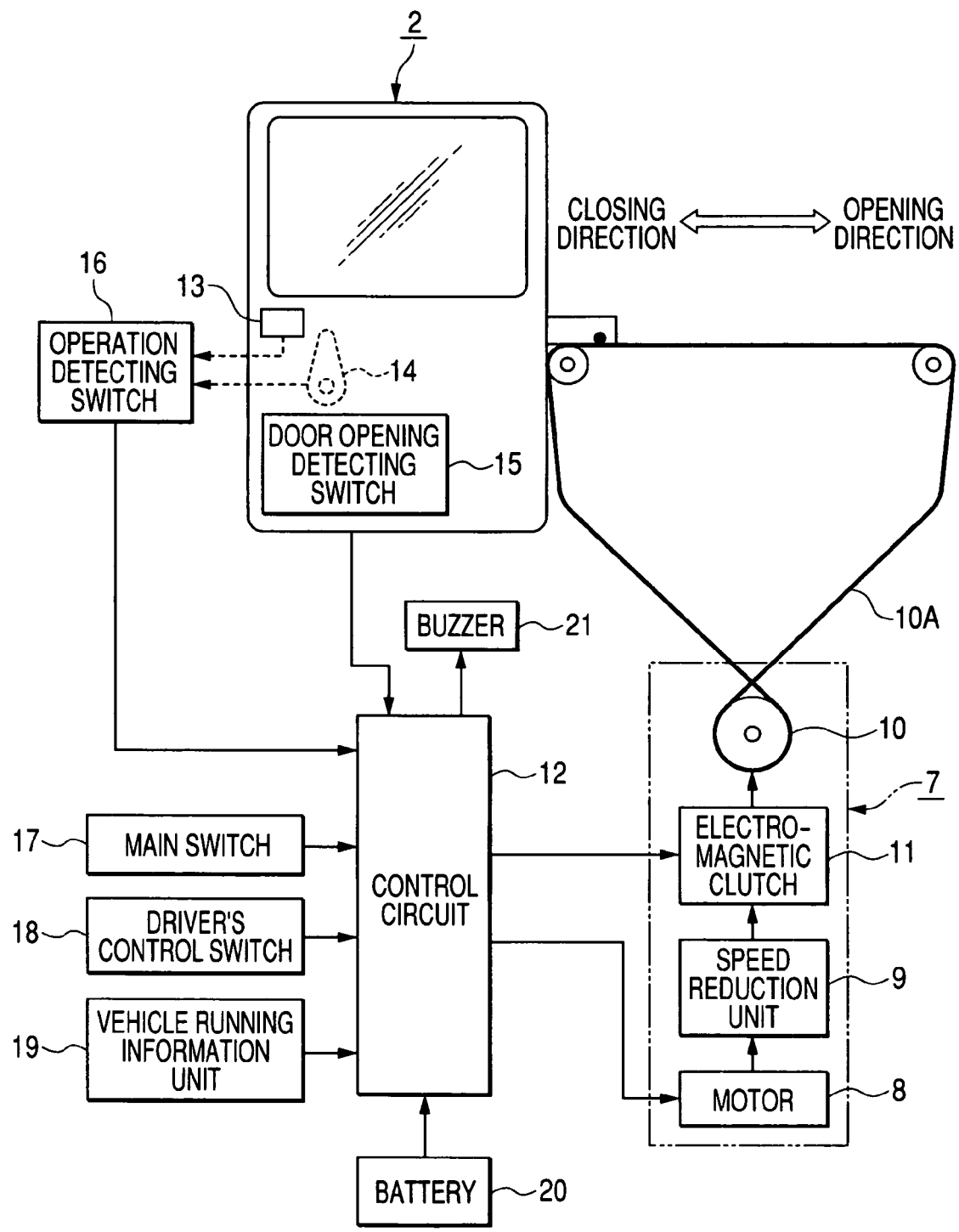
FIG. 2 is a block diagram showing a control system of a powered opening and closing system shown in FIG. 1.
Figure 3:
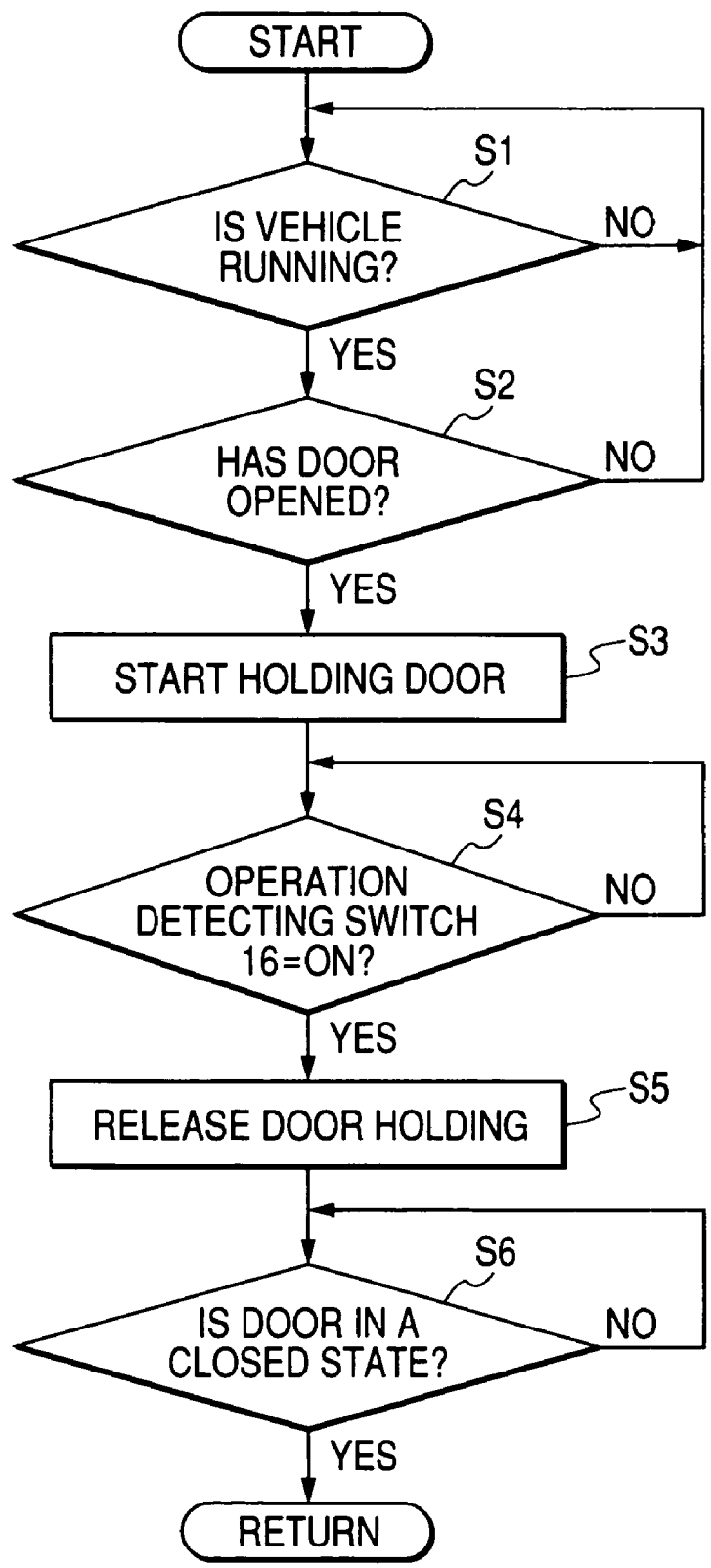
FIG. 3 is a flowchart illustrating a control procedure of a control circuit shown in FIG. 2.

Hereinafter, an embodiment according to the invention will be described based on the drawings. FIG. 1 is a side view of a vehicle to which the invention is applied, FIG. 2 is a block diagram showing a control system of a powered opening and closing system, and FIG. 3 is a flowchart illustrating a control procedure of the powered opening and closing system. Note that in the following description, as viewed in FIG. 1, it is understood that the left denotes the "front" and the right denotes the "rear."

A sliding door 2, which configures an openable and closable door of a vehicle 1 such as a minivan, a multi-purpose vehicle or a van, is supported in such a manner as to move to the rear to open and to the front to close by longitudinally extending upper, middle and lower guide rails 4, 5, 6 which are fixed to a body 3 and hence can be moved manually or by virtue of power of drive mechanism 7 from a fully closed position where the door closes a doorway provided in a side of the body 3 through which an occupant gets in and out of the vehicle to a fully open position where the door is so moved along the side of the body 3 to reach its rearmost position while being shifted slightly transversely outwards from an external surface of the body 3 and vice versa.

The sliding door 2 is held in the fully closed position by a door latch device (whose illustration is omitted) provided at a rear end portion thereof being brought into engagement with a striker (whose illustration is omitted) secured to the body side. By operating any of an outside handle 13 provided on an external side of the sliding door 2, an inside handle 14 provided on an internal side of the door, a driver's control switch 18 which is provided to be reached by the driver seated in the driver's seat or a portable remote control controlling switch (whose illustration is omitted), the sliding door 2 is moved in an opening direction by virtue of the power of the drive mechanism 7 after the engagement of the door latch device with the striker has been released when the sliding door 2 is closed, and when the sliding door 2 is opened, the sliding door 2 can be moved to the fully closed position.

In addition, when an operation prohibiting condition, which will be described later, is detected or when a main switch 17 provided near the driver's seat is switched off, the driving of a motor 8 of the drive mechanism 7 is prohibited, and even though the driver's switch 18 or the remote control controlling switch is operated, the sliding door 2 cannot be moved to open or close. However, since the respective handles 13, 14 are mechanically connected to the door latch device, when either the outside handle 13 or the inside handle 14 is operated, the engagement with the door latch device with the striker can be released so that the sliding door 2 can manually be moved to open. In addition, the inside handle 14 is configured to be operated in an opening direction when attempting to operate the sliding door 2 to open and in a closing direction when attempting to operate the sliding door 2 to close.

The drive mechanism 7 is disposed within the body 3 and is made up of the motor 8 which can rotate forwards and backwards, a speed reduction unit 9 which reduces the rotational speed of the motor 8, an output rotary drum 10 around which a cable 10A, which is provided to extend along the middle guide rail 5 and is connected to a central rear end portion of the sliding door 2, is wound in such a manner as to taken up thereround or fed out therefrom and an electromagnetic clutch 11 which is provided along a power transmission path which links the speed reduction unit 9 and the output rotary drum 10 for connecting and disconnecting the power transmission path. In addition, the speed reduction unit 9 is made up of speed reduction gears such as a worm and a worm wheel which are made to mesh with each other in such a manner as to prohibit a reversible rotation.

The motor 8 and the electromagnetic clutch 11 are controlled by a control circuit 12 equipped on the body. When the motor 8 is controlled to be driven and the electromagnetic clutch 11 is controlled to be in an engaged state, the rotation of the motor 8 is transmitted to the sliding door 2 via the speed reduction unit 9, the electromagnetic clutch 11, the output rotary drum 10 and the cable 10A. Accordingly, the sliding door 2 is made to automatically open or close by virtue of power of the motor 8. In addition, when the electromagnetic clutch 11 is in a disengaged state, since the sliding door 2 is not subjected to a resistance which reverses the speed reduction unit 9 and the motor 8, the sliding door 2 can manually be operated to open or close. In addition, in the event that the electromagnetic clutch 11 is controlled to be engaged with the motor 8 kept stopped when the sliding door 2 is opened, the resistance which reverses the speed reduction unit 9 and the motor 8 is exerted on the sliding door 2, and the resistance configuress a braking force which holds the sliding door 2 in the opened position, thereby making it possible to hold the sliding door 2 in the opened position by the braking force.

The control circuit 12 is made up mainly of a microcomputer, and electrically connected to an input port thereof are a door opening detecting sensor 15, an operation detecting sensor 16, the main switch 17 and the driver's control switch 18, a vehicle running information unit 19 and a battery 20, and the motor 8, the electromagnetic clutch 11 and a buzzer 21 are electrically connected to an output port of the microcomputer.

The operation detecting sensor 16 detects an opening or closing operation of the outside handle 13 and the inside handle 14 and transmits to the control circuit 12 an opening operation signal when it detects respective opening operations of the handles 13, 14 and a closing operation signal when the sensor detects respective closing operations thereof. The driver's control switch 18 is operated when making the sliding door 2 automatically open or close by virtue of the power of the motor 8. The door opening detecting sensor 15 detects that the sliding door 2 has opened and transmits a door opening signal to the control circuit 12. Note that as the door opening detecting sensor 15, there are a courtesy switch which is turned on and off in response to the sliding door 2 opening and closing, a latch switch which is turned on and off according to rotational positions of the latch (which is a component adapted to be brought into engagement with and disengagement from the striker) and a rotary encoder or a linear encoder which is used to detect a moving direction or moving amount of the sliding door 2. In the case of the rotary encoder or the linear encoder being used, an operating unit is provided on the control circuit 12 which works based on processing software for operating the position of the sliding door 2 based on a moving (rotating) direction or a moving amount (a rotational angle) of the sliding door 2 (or the output rotary drum).

When the sliding door 2 is in the fully closed position, by taking the opportunity that an opening operation signal is transmitted thereto from the remote control controlling switch, the driver's control switch 18 or the operation detecting sensor 16, the control circuit 12 executes a door opening control in which the motor 8 is controlled to rotate in the opening direction and the electromagnetic clutch 11 is engaged, and when the sliding door 2 is in the fully open position, by taking the opportunity that a closing operation signal is transmitted thereto, the control circuit 12 executes a door closing control in which the motor 8 is controlled to rotate in the closing direction and the electromagnetic clutch 11 is engaged.

The main switch 17 is provided near the driver's seat and can be switched on and off. When the main switch 17 is in the on state, the control circuit 12 validates respective control signals of the remote control controlling switch, the driver's control switch 18 and the operation detecting sensor 16 and negates respective control signals of the remote control controlling switch, the driver's control switch 18 and the operation detecting sensor 16 when the main switch 17 is in the off state. Namely, when the main switch 17 is in the on state, the sliding door 2 can be made to automatically open or close by virtue of the power of the drive mechanism 7 by operating any of the remote control controlling switch, the driver's control switch 18, the outside handle 13 or the inside handle 14, while when the main switch 17 is in the off state, even through any of the remote control controlling switch, the driver's control switch 18, the outside handle 13 or the inside handle 14 is operated, the sliding door 2 cannot be made to automatically open or close by virtue of the power of the drive mechanism 7. However, even though the main switch 17 is in the off state, as long as an operation prohibiting condition is not detected, the electromagnetic clutch 11 is enabled to be controlled to be connected or disconnected based on a predetermined condition.

The vehicle running information unit 19 transmits an operation prohibiting signal to the control circuit 12 by detecting an operation prohibiting condition such as that the vehicle is running or that the vehicle is ready for running, or more specifically, for example, a state in which the vehicle speed is equal to or faster than a predetermined value and the gearshift lever of the automatic transmission is in the D range or a state in which the parking brake and/or the foot brake is not applied, and cancels the transmission of the operation prohibiting signal by detecting a state in which the vehicle is stopped, or more specifically, for example, a state in which the gearshift lever of the automatic transmission is in the P range or a state in which the vehicle speed is equal to or slower than a predetermined value and the parking brake and/or the foot brake is applied.

The control circuit 12 executes a control shown in FIG. 3 when the vehicle running information unit 19 detects the operation prohibiting condition. Namely, at step S1, the control circuit 12 determines whether or not the vehicle running information unit 19 detects the operation prohibiting condition or whether or not the vehicle is running or is ready for running, and if YES, the control circuit 12 sets an operation prohibiting mode and negates respective control signals of the remote control controlling switch, the driver's control switch 18 and the operation detecting sensor 16, so as to prohibit the automatic opening or closing operation of the sliding door 2 by virtue of the power of the motor 8 in the drive mechanism 7.

At step S2, if the control circuit 12 detects that the inside handle 14 is erroneously operated or played with to open the sliding door 2 and the sliding door 2 is actually opened, then at step S3, the control circuit 12 controls the electromagnetic clutch 11 to be engaged by taking the opportunity that a door opening signal is transmitted thereto from the door opening detecting sensor 15. Accordingly, a braking force is momentarily imparted to the sliding door 2 which is opening so as to stop the sliding door 2 without allowing the door to move largely in the opening direction to thereby hold the door in that position. In addition, as the same time as this occurs, the control circuit 12 activates the buzzer to inform the occupants that the sliding door 2 has opened.

At step S4, the control circuit 12 determines whether or not the inside handle 14 is operated to move in the closing direction based on the intention of the operator and the operation detecting sensor 16 has detected the door closing operation. If the control circuit 12 so detects, at step S5, the control circuit 12 controls the electromagnetic clutch 11 to be disengaged so as to release the braking force. Accordingly, at step S6, the control circuit 12 enables a manual closing of the sliding door 2 without subjecting the sliding door 2 to the resistance which reverses the motor 8 and the speed reduction unit 9, thereby the sliding door 2, which is now being open, being able to be closed based on the intention of the operator. In addition, if it is determined at step S4 that the inside handle 14 is operated to move in the opening direction and the operation detecting sensor 16 detects the door opening operation, the control circuit 12 does not control the electromagnetic clutch 11 to be disengaged. By adopting this configuration, a further moving of the sliding door 2 in the opening direction is prevented, so as to enhance the safety of the occupants.

Figure 4:
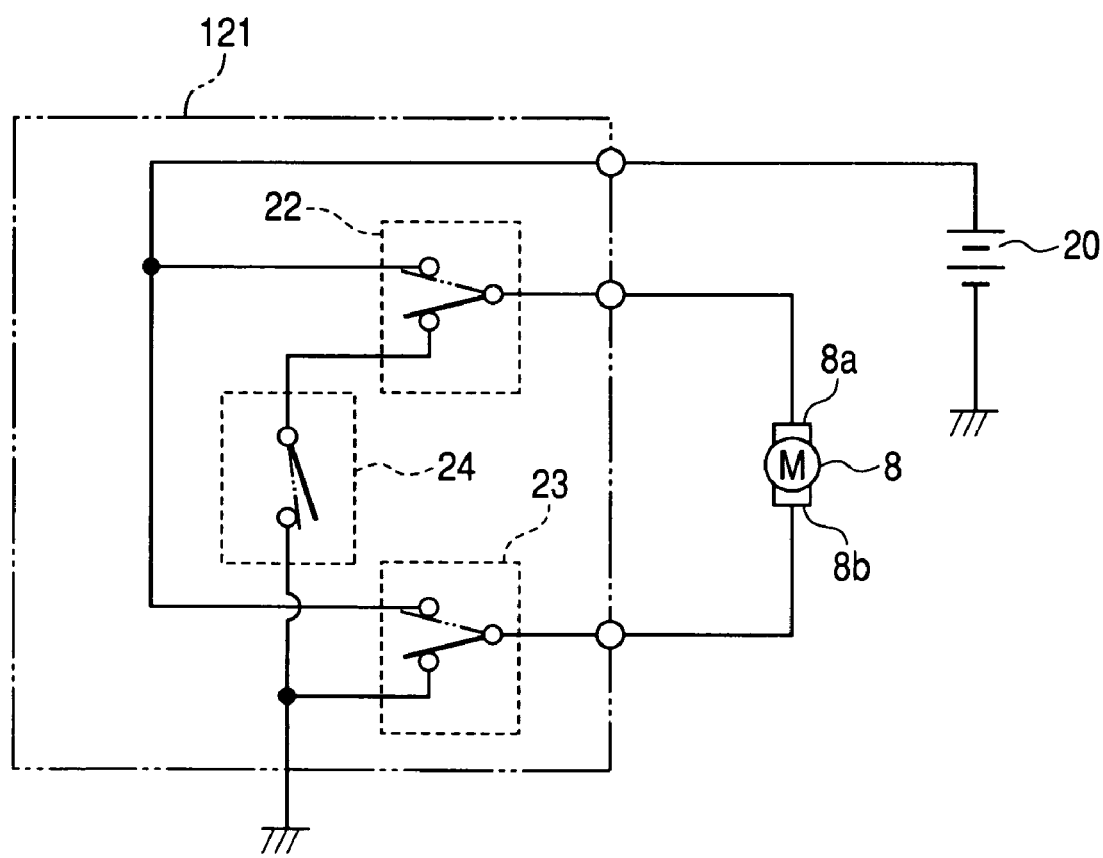
FIG. 4 is a main part of a circuit diagram according to another embodiment.

FIG. 4 shows a main part of a control circuit of another embodiment. A drive mechanism 7 of a powered opening and closing system of this embodiment does not include an electromagnetic clutch like one provided in the embodiment that has been described above. Note that since this embodiment is the same as the embodiment shown in FIG. 2 except that no electromagnetic clutch is provided and that a control circuit 121, which will be described later, has relays 22, 23, 24, the illustration of the same portions will be omitted, and in the following description, like reference numerals will be imparted to like constituent components to those of the embodiment shown in FIG. 2.

A speed reduction unit 9 of the drive mechanism 7 is made up of gears which mesh with each other in such a manner as to permit a reversible rotation, and when a sliding door 2 is manually operated to open or close, the motion in question of the sliding door 2 is made to be transmitted to a motor 8 via a cable 10A and the speed reduction unit 9, so as to make the motor 8 rotate reversely.

Figure 5:
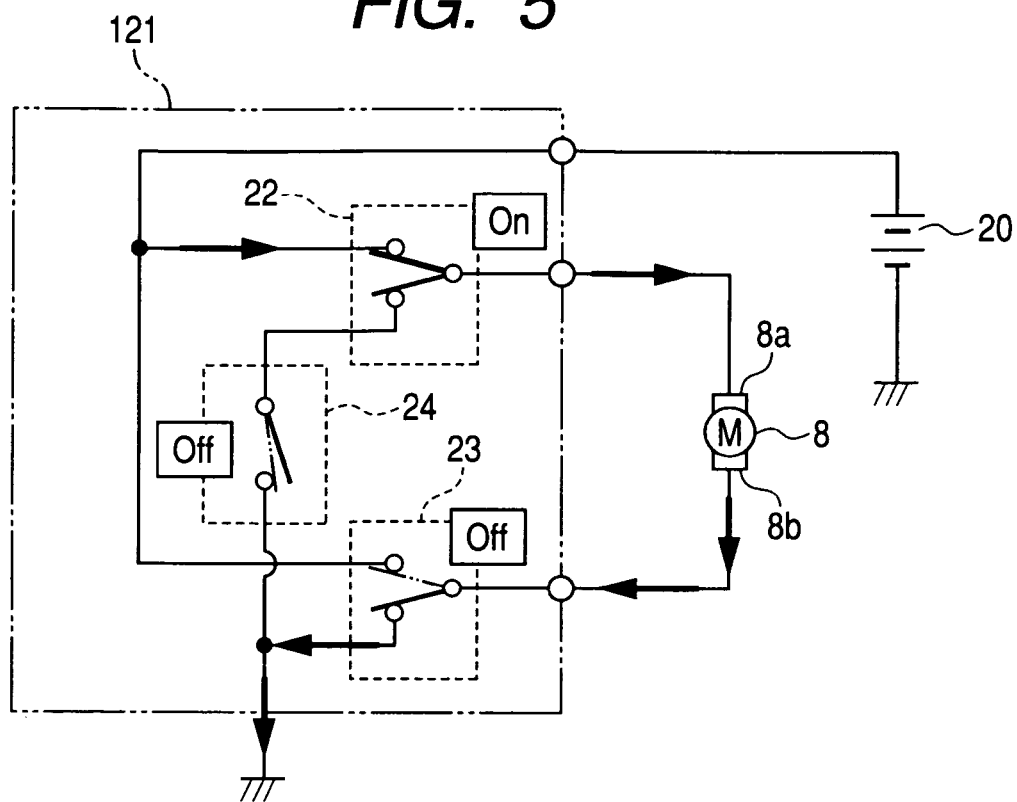
FIG. 5 is a schematic circuit diagram when making a motor rotate in an opening direction in FIG. 4.
Figure 6:
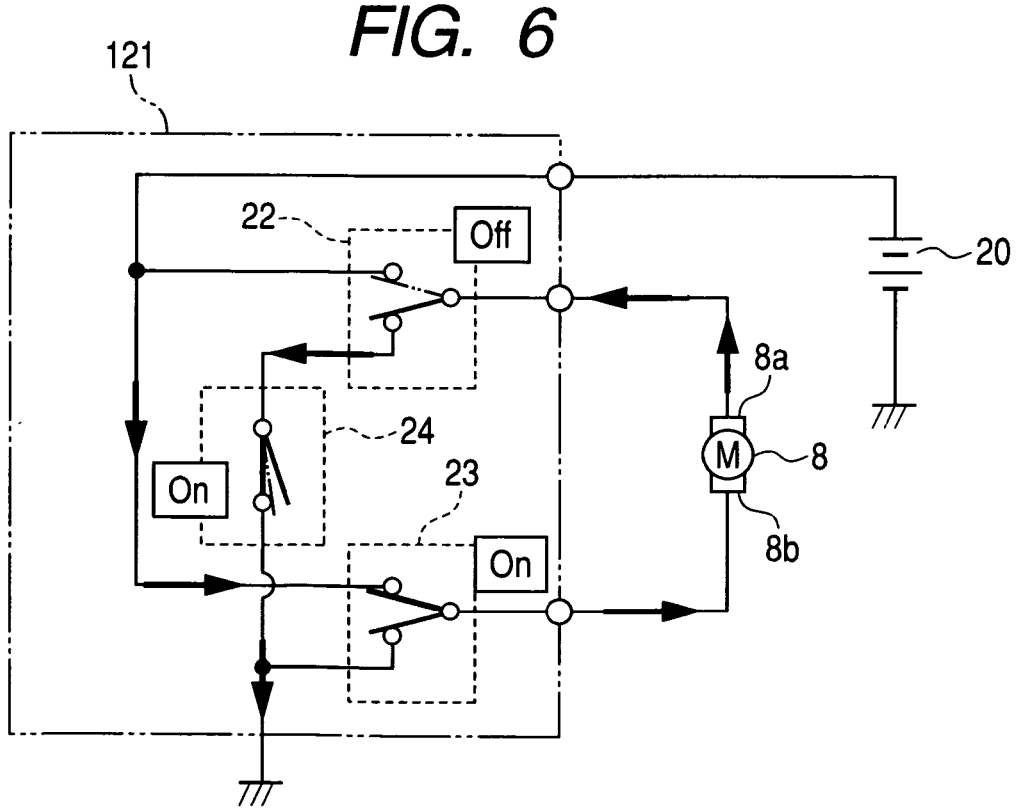
FIG. 6 is a schematic circuit diagram when making the motor rotate in a closing direction in FIG. 4.

The control circuit 121 includes a door opening switching relay 22, a door closing switching relay 23 and brake circuit relay 24. The door opening switching relay 22 is switched from off (a position indicated by a solid line) to on (a position indicated by a chain double-dashed line when making the motor 8 rotate in the opening direction (see FIG. 5). The door closing switching relay 23 is switched from off (a position indicated by a solid line) to on (a position indicated by a chain double-dashed line when making the motor 8 rotate in the closing direction (see FIG. 6). The brake circuit relay 24 is switched off (a position indicated by a solid line) to on (a position indicated by a chain double-dashed line when brake is applied to the rotation of the motor 8.

The brake circuit relay 24 is controlled to be in the off state when a vehicle running information unit 19 does not detect an operation prohibiting condition and to be switched to the on state when the operation prohibiting condition is detected and an opening of the sliding door 2 is detected. When the brake circuit relay is in the on state, the brake circuit relay 24 establishes a brake circuit (a circuit which links the motor terminal 8a, the door opening switching relay 22, the brake circuit relay 24, the door closing switching relay 23 and the motor terminal 8b) for shorting across the terminals 8a and 8b of the motor 8 so as to apply the brake to the rotation of the motor 8.

When the door opening detecting sensor 15 detects the opening of the sliding door 2 while the vehicle running information unit 19 detects the operation prohibiting condition, by taking this opportunity, the brake circuit relay 24 is switched to the on state so as to establish the brake circuit between both the terminals 8a, 8a of the motor 8, and the brake is applied to the rotation of the motor 8. Accordingly, a braking force is applied to the sliding door 2, and the sliding door 2 can be held in the open position momentarily. Then, when the operation detecting sensor 16 detects the closing operation of the inside handle 14, by taking this opportunity, the brake circuit relay 24 is switched to the off state so as to cancel the brake circuit, and a manual closing operation of the sliding door 2 is enabled.

Figure 7:
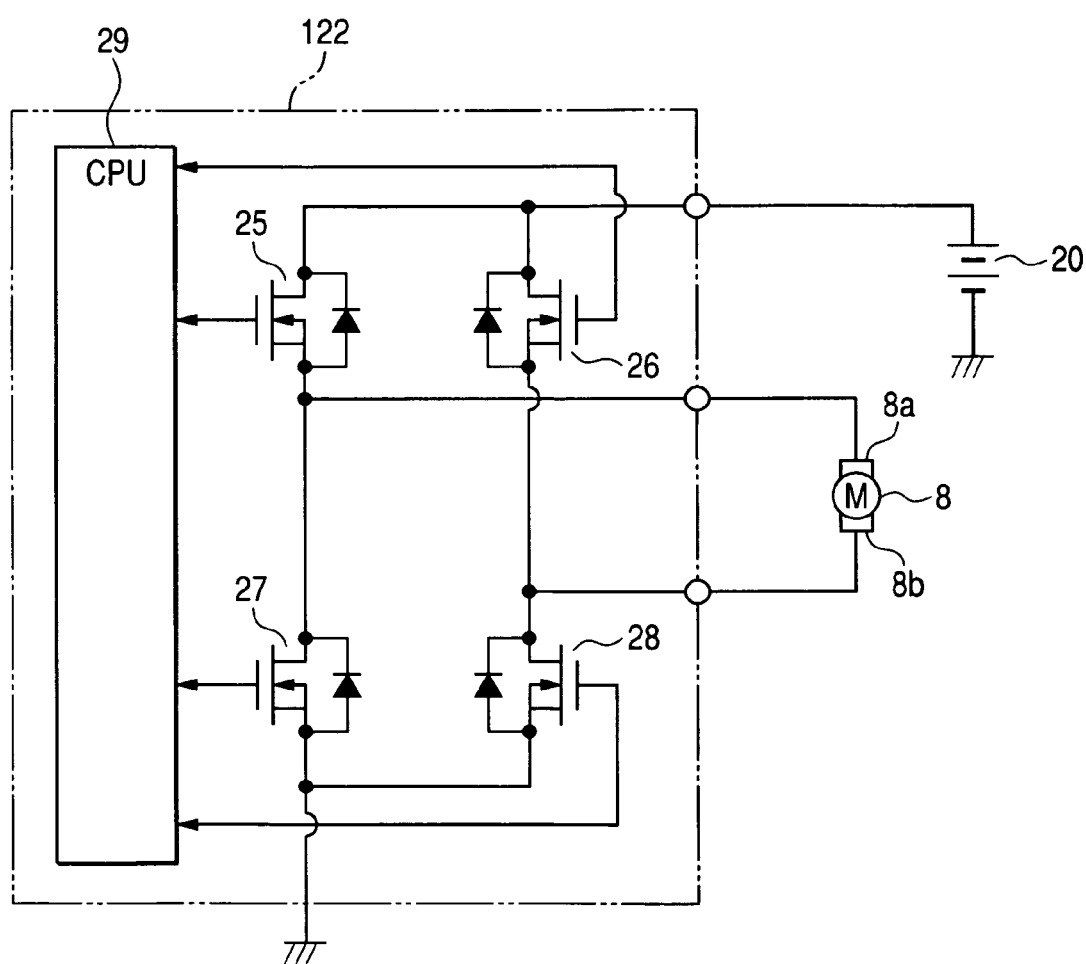
FIG. 7 is a main part of a circuit diagram according to a further embodiment.

FIG. 7 shows a main part of a control circuit of a further embodiment of the invention. Also, in a powered opening and closing system of this embodiment, a drive mechanism 7 does not include an electromagnetic clutch as with the embodiment shown in FIG. 4. Note that since this embodiment is also the same as the embodiment shown in FIG. 2 except that no electromagnetic clutch is provided and that a control circuit 122, which will be described later, has FET's (Field Effective Transistors) 25 to 28, the illustration of the same portions will be omitted, and in the following description, like reference numerals will be imparted to like constituent components to those of the embodiment shown in FIG. 2.

A speed reduction unit 9 of the drive mechanism 7 is made up of gears which mesh with each other in such a manner as to permit a reversible rotation, and when a sliding door 2 is manually operated to open or close, the motion in question of the sliding door 2 is made to be transmitted to a motor 8 via a cable 10A and the speed reduction unit 8, so as to make the motor 8 rotate reversely.

The control circuit 122 has first to fourth FET's 25 to 28, a CPU (Central Processing Unit) for controlling the respective FET's 25 to 28 and the like and controls the first and fourth FET's 25, 28 to be on by applying a voltage to their gates when making the motor 8 rotate in the opening direction, the second and third FET's 26, 27 to be on by applying a voltage to their gates when making the motor 8 rotate in the closing direction and the third and fourth FET's 27, 28 (or the first and second FET's 25, 26) to be on when the brake is applied to the rotation of the motor 8.

When a door opening detecting sensor 15 detects the opening of the sliding door 2 while a vehicle running information unit 19 detects an operation prohibiting condition, by taking this opportunity, the third and fourth FET's 27, 28 are both controlled to be on. Accordingly, a brake circuit (a circuit which links a motor terminal 8a, the third FET 27, the fourth FET 28, and a motor terminal 8b) which short-circuits between the terminals 8a, 8b of the motor 8 becomes on, and the brake is applied to the rotation of the motor 8. By this action, a braking force is applied to the sliding door 2, and the sliding door 2 is held in the open position momentarily. Then, when an operation detecting sensor 16 detects the closing operation of an inside handle 14, by taking this opportunity, the third and fourth FET's 27, 28 are controlled to be off so as to control the brake circuit to be off, thereby a manual closing operation of the sliding door 2 being enabled.

Note that the openable and closable door to which the invention is applied is not limited to the sliding door 2, and hence, the invention can be applied, for example, to a swinging side door or rear door.

What is claimed is:

1. A powered opening and closing system for a vehicle door, comprising:
   a motor;
   a drive mechanism for moving the door in opening and closing directions using the motor;
   an operation detecting sensor for detecting a handle operation when the door is operated to open/or close;
   a control circuit for prohibiting operation of the drive mechanism when a predetermined operation prohibiting condition is detected and;
   a vehicle running information unit that detects the predetermined operation prohibiting condition,
   wherein the drive mechanism comprises a clutch that is configured to connect and disconnect a power transmission path between the motor and the door, the drive mechanism braking movement of the door by putting the clutch in an engaged state while the motor is kept stopped, and
   wherein, while the predetermined operation prohibiting condition is detected, the control circuit is operable to:
      control the clutch to be engaged while keeping the motor stopped when an opening of the door from a fully closed position is detected; and
      control the clutch to be disengaged when a door closing operation of the handle is detected by the operation detection sensor,
      wherein the control circuit controls the clutch to be disengaged only when the operation detecting sensor detects an operation of the handle in a door closing direction.

2. A powered opening and closing system for a vehicle door, comprising:
   a motor;
   a drive mechanism for moving the door in opening and closing directions using the motor;
   an operation detecting sensor for detecting a handle operation when the door is operated to open or close;
   a control circuit for prohibiting operation of the drive mechanism when a predetermined operation prohibiting condition is detected and;
   a vehicle running information unit that detects the operation prohibiting condition,
   wherein the control circuit comprises a brake circuit that is configured to brake the rotation of the motor by shorting across terminals of the motor, and
   wherein, while the predetermined operation prohibiting condition is detected, the control circuit is operable to:
      control the brake circuit to be on when an opening of the door from a fully closed position is detected; and
      control the brake circuit to be off when a door closing operation of the handle is detected by the operation detecting sensor,
      wherein the control circuit controls the brake circuit to be off only when the operation detecting sensor detects an operation of the handle in a door closing direction.

3. The powered opening and closing system for a vehicle door according to claim 2, wherein the brake circuit comprises a relay.

4. The powered opening and closing system for a vehicle door according to claim 2, wherein the brake circuit comprises a field-effect transistor.

* * * * *